Oct. 22, 1929.  J. BRUGGMANN  1,732,431
ELECTRODE SEAL FOR ELECTRIC FURNACES
Filed Dec. 6, 1926
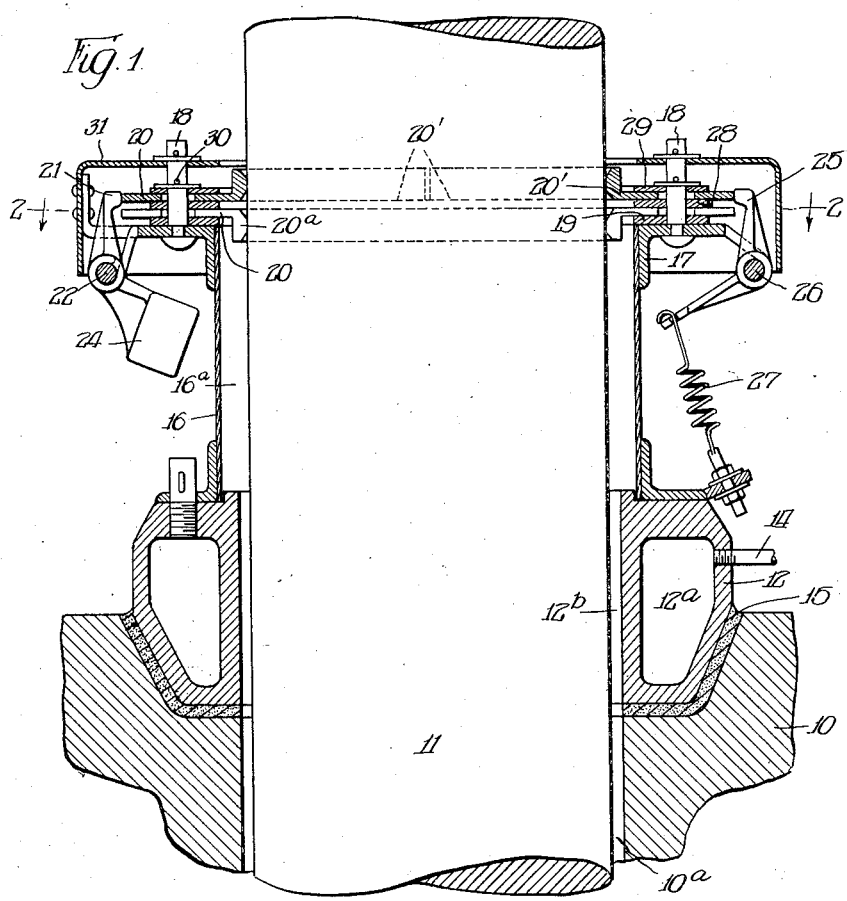
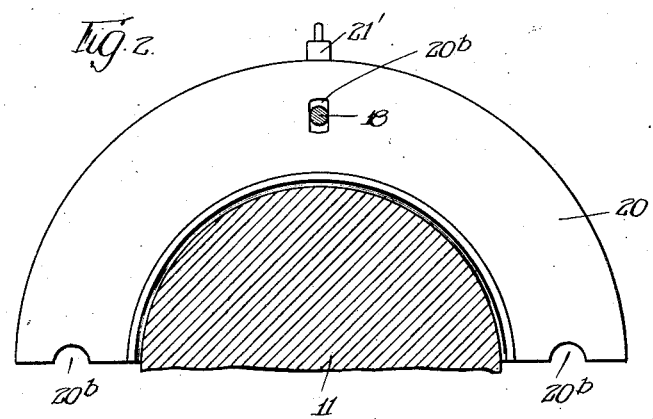
Witness:
A. Burkhardt
Inventor:
Johann Bruggmann, Patented Oct. 22, 1929

1,732,431

UNITED STATES PATENT OFFICE

JOHANN BRUGGMANN, OF NEUENHOF, NEAR BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

ELECTRODE SEAL FOR ELECTRIC FURNACES

Application filed December 6, 1926, Serial No. 152,753, and in Germany January 2, 1926.

This invention relates to electric furnace construction and pertains particularly to an arrangement for sealing the space between the electrode and the furnace wall or cover where the former passes through the latter.

The general object of the invention is the provision of a construction which will maintain an effective seal or closure between the furnace and the surface of the electrode for the purpose of preventing the high heating of the electrode in contact with air outside the furnace and the erosion of the electrode by escaping gases.

One of the specific objects of the invention is the provision of a form of sealing device which will accomplish the result just specified and also provide for the partial cooling of furnace gases in contact with the electrode inside the seal, so that the portions of the electrode adjacent the point where it is exposed to air may be partially cooled and the temperature differential, between the area inside the seal and the area exposed to atmosphere, reduced.

Another object is the provision of an apparatus whereby a close seal may be maintained on the surface of the electrode incident to the shifting or adjustment thereof.

Yet another object is the provision of a device of the sort specified which is particularly qualified to withstand the high heat of the furnace and the various mechanical stresses incurred incident to the operation of the same and the manipulation of the electrodes, without injury or impairment of its function.

Another specific object is the provision of a device of the sort specified which will afford an effective seal with minimum contact on the surface of the electrode.

Other purposes and advantages of the invention will be pointed out or indicated hereinafter, or will be apparent to one skilled in the art from the present disclosure or upon use of the invention in practice.

In the accompanying drawing forming a part of this specification, I show one example of a construction embodying the invention, but the same is presented for purpose of illustration only, and is not to be construed in any fashion to limit the claims short of the true and most comprehensive scope of the invention in the art.

In the drawing,

Fig. 1 is an illustration in the nature of a sectional elevation, taken on a diameter, of one form of sealing device, showing it in association with a portion of an electrode and a part of the furnace wall or cover; and Fig. 2 is a part cross section on substantially line 2—2 of Fig. 1, showing one of the sealing ring segments in plan.

In the operation of electric furnaces, the portions of the electrode within the furnace are subjected to very high temperatures, while portions immediately adjacent in the length of the electrode are exposed to the much lower temperature of the external air. As a result, the temperature differential between these portions of the electrode is likely to be quite large, with the result that the material of the electrode is subjected to internal strains which tend to its disintegration. Moreover, the exposure of highly heated portions of the electrode to the air outside of the furnace tends to its deterioration, and the flow of hot gases along the surface of the electrode from the furnace into the air tends to exert an eroding effect upon the electrode. Various cooling and sealing arrangements have been devised with the object of preventing or minimizing these destructive influences.

The present invention aims to provide a close seal on a limited surface area of the electrode which will prevent the rapid flow of gases to the air along the same, and to reduce the temperature differential between the parts exposed to air and those within the seal so that the drop will not be so great between closely adjacent portions of the electrode material, and at the same time prevent the exposure of highly heated portions of the electrode to the air outside the furnace. The nature of the device may be ascertained from the example illustrated in the drawing. In this, the reference character 10 designates a portion of the furnace wall or cover, having an aperture $10^a$ through which the electrode 11 extends with a clearance. Above this aperture is arranged a cooling ring or collar 12 having the interior water circulating channel 12ª which is supplied by a suitable connection 14, said cooling ring or collar having an aperture 12ᵇ in alignment with the aperture 10ª. This cooling ring is sealed to the furnace with sand or other refractory material 15. Mounted on top of the ring 12, and extending upwardly therefrom, is a housing collar 16 of such diameter as to afford a clearance space 16ª between its inner wall and the surface of the electrode. At the top of the collar 16 is an angle ring 17 which supports the upwardly extending studs 18. On top of the angle ring 17 is a flat bearing ring 19 having its top face extending normal to the electrode axis. On the bearing ring 19 rest the sealing ring segments 20. These segments are complementary so that together they encircle the electrode except for small accommodation spaces between the ends of the complementary segments. They are thickened at their inner margins to provide the bearing and sealing flanges 20ª, and are shiftable on the bearing ring 19 so that they may accommodate themselves to the position of the electrode. The interior radius of the sealing flanges 20ª is such that they make continuous contact with the cylindrical surface of the electrode. Slots 20ᵇ accommodate the passage of the studs 18 and permit shifting of the segments. The respective segments are pressed toward the electrode and held in contact therewith by continuously acting pressure devices. That shown at the left hand side of Fig. 1 comprises a lever 21, pivoted at 22 on a bracket carried by the angle ring 17 and loaded with a weight 24 tending to swing the lever toward the electrode. The pressure device illustrated at the right hand side of Fig. 1 comprises the lever 25, which bears against the margin of a segment and is pivoted at 26 and stressed by a spring 27 to exert a continuous inward pressure on the segment. On top of the segments 20 is placed a spacing ring 28 having flat top and bottom faces, and upon this spacing ring are positioned segments 20′ similar to the segments 20 but disposed so that their ends are in broken-joint relationship to those of said lower segments. An upper ring 29 rests on top of the segments 20′, and the segments and their contacting rings are held in assembled relationship by fastenings 30 on the studs 18. A cover 31 houses the rings and segments, being supported on brackets from the angle ring 17. The segments 20 are pressed into contact with the electrode by pressure devices 21′ which may be similar to those illustrated in Fig. 1 and described above for pressing segments 20′ into such contact.

When thus installed, the sealing flanges of the segments are held in contact with the surface of the electrode and form thereon a seal preventing the rapid flow of gases from the gas space 16ª. Gases passing from the furnace through the space 10ª are subjected to the cooling influence of the cooling ring 12, so that they enter the gas space 16ª at substantially reduced temperatures. In the gas space 16ª they are held confined about the electrode, functioning to conduct heat from the electrode to the gas collar 16, whence it is disipated in the air. The cooling influence of the cooling ring 12 is also effective to carry away heat from the electrode. As a result, there is an appreciable reduction in the temperature of the electrode from the point where it passes out of the furnace to the point where it is exposed to air, this cooling taking place over the extent of the electrode between the furnace and the sealing segments. Within this area, the surface of the electrode is free from contact with the surrounding members, so that extraction of heat is neither hastened nor retarded in particular localities within that area. The gases which are held pocketed in the gas space 16ª and in the spaces 10ª and 12ᵇ are not rapidly displaced, as their only egress is the limited leakage between the ends of the segments. The gases, when they do find egress by leakage, are so cooled, and the leakage flow so restricted, that they do not produce a destructive heating of the electrode material where they find outlet to atmosphere, nor do they exert an erosive action. The cooling of the electrode is distributed over such an extent that the drop is gradual and adjacent portions of material are not subjected to the disintegrating internal strains which are likely to be produced where the electrode passes to the atmosphere from a highly heated environment. One of the factors contributing to this more gradual reduction in temperature through the cooling area is the exposure of the electrode surface to a tempered heat-conducting medium throughout the cooling zone.

What I claim is:

1. In an electric furnace, an electrode extending through a wall of said furnace for adjustment with respect thereto, means disposed for engagement with said electrode and being operable by virtue of such engagement to provide a fluid tight seal between the furnace wall and said electrode while permitting of adjusting movement of the latter, means disposed for pivotal movement and for coaction with said sealing means upon such movement and being operable upon such coaction to hold said sealing means in sealing engagement with said electrode, means providing a pivotal support for said second-named means, and means associated with said second-named means and being operable to yieldingly hold the same in such coacting relation with said sealing means.

2. In an electric furnace, an electrode extending through a wall of said furnace for adjustment with respect thereto, means disposed for engagement with said electrode and being operable by virtue of such engagement to provide a fluid tight seal between the furnace wall and said electrode while permitting of adjusting movement of the latter, means disposed for pivotal movement and for co-action with said sealing means upon such movement and being operable upon such co-action to hold said sealing means in sealing engagement with said electrode, means providing a pivotal support for said second-named means, and gravity-actuated means associated with said second-named means and operating under the influence of gravity to yieldingly hold the latter in such coacting relation with said sealing means.

3. In an electric furnace, an electrode extending through a wall of said furnace, complementary cooperating plates disposed about said electrode in fitting engagement therewith to provide a fluid tight seal between the furnace wall and said electrode, means supporting said plates, means providing a pin-and-slot guiding connection between said supporting means and said plates, and means urging said plates into fitting engagement with said electrode.

In testimony whereof I have hereunto subscribed my name at Zurich, Switzerland, this 19 day of November A. D. 1926.

JOHANN BRUGGMANN.